Patented Mar. 6, 1945

2,371,065

UNITED STATES PATENT OFFICE 2,371,065

MODIFIED VINYL RESINS

Paul O. Powers, Manheim Township, Lancaster County, Pa., assignor to Armstrong Cork Company, Lancaster, Pa., a corporation of Pennsylvania No Drawing. Application January 15, 1941, Serial No. 374,455

16 Claims. (Cl. 260—27)

This invention relates to modified vinyl resins.

It is an object of the invention to produce novel modified vinyl resins having high viscosity by forming compatible, homogeneous combinations of the vinyl resins with rosin or hydrogenated rosin and a polyhydric alcohol.

The type of vinyl resins which it has been found possible to modify in the manner hereinafter more particularly set forth include the polyvinyl organic esters, such as polyvinyl acetate, propionate, etc., and also polyvinyl partial acetals, such as polyvinyl formal, acetal proper, propional, and butyral, containing residual organic ester groups or hydroxy groups. The polyvinyl acetals are usually produced from polyvinyl esters, such as the acetate after or simultaneously with the hydrolysis of such polyvinyl ester. Such hydrolysis may or may not be complete, and the reaction with aldehyde to produce the acetal generally does not consume all of the hydroxyl groups unless the hydrolysis of the ester resin is incomplete. The result is that the acetals may contain residual hydroxyl or ester groups or both, the residual ester groups most commonly being acetate groups since this is the ester most frequently employed in the production of the acetals. It is old to flux polyvinyl acetate with rosin. However, the present invention contemplates the modification of the vinyl resins specified above not merely with rosin but with rosin and a polyhydric alcohol to produce resins of low acidity and consequently higher resistance to acids and alkalies. It has also been found that by combining a polyhydric alcohol with the modified resin in the manner hereinafter disclosed a greater proportion of vinyl resin can be mixed with the rosin without causing gelling which would occur if the polyhydric alcohol were not used. Furthermore, the resins resulting from the process employed in this invention are not equivalent to the mixtures that would be obtained by fluxing the vinyl resins with ester gum, for it has been found that when polyvinyl acetate and ester gum are fluxed, the condition of compatibility is never approached completely.

In making the modified resins according to the invention, from 15 to 35 parts by weight of the vinyl resin are heated with 100 parts by weight of rosin to a temperature of the order of 270° C. to 275° C. for a period of time ranging from one-half to one hour, more or less. During this period of heating, reaction occurs in which it is believed that a certain proportion of the ester or hydroxyl groups (and possibly even the acetal groups by first undergoing hydrolysis) in the vinyl resin are replaced with the abietate group of rosin. This ester interchange or esterification (or hydrolysis and esterification) may be somewhat accelerated by adding a small amount, for example from 2 to 5 parts by weight, of litharge to the initial reaction mixture. The effect of this accelerator is manifested by a certain reduction of the acidity of the vinyl modified resin.

The second essential part of the process is the reaction of the rosin-modified vinyl resin with a polyhydric alcohol, which reaction may be caused to take place during the reaction of the rosin upon the vinyl resin or afterwards. This step of the reaction is also carried out at a temperature of the order of 270° C. to 275° C., the time employed being usually from about four to six hours. It is believed that the reaction occuring in this step is esterification of the remaining free, at least the greater part of the remaining free, acid groups of the rosin employed in the preceding step. When the vinyl resin is treated simultaneously with the rosin and the polyhydric alcohol, it has been found possible to increase the proportion of the vinyl resin relative to the amount of rosin without the formation of insoluble and infusible gels.

Instead of rosin, hydrogenated rosin may be used and is especially preferred where higher resistance to oxidation of the final resin is desired. Such polyhydric alcohols as glycerine, diethylene glycol, propylene glycol, ethylene glycol, diglycerol, mannitol, sorbitol, and erythritol are examples of polyhydric alcohols which are useful for carrying out this invention. Of these, glycerol is preferred.

The viscous modified resins obtained in accordance with this invention are useful as such as lacquers or other coating compositions, as adhesives or components thereof, or as vehicles of paints, and varnishes. To adapt them for use in paint and varnishes, they may be cooked with drying oils.

In the examples, the proportions are stated in parts by weight.

Example 1

To 100 parts of rosin, 15 parts of a partial polyvinyl butyral containing residual acetate groups and possibly also hydroxyl groups and 11½ parts of glycerine were added and the mixture was heated to a temperature ranging from 270° C. to 278° C. for a period of six hours. The resinous product had an acid number of about 15, and was but slightly soluble in mineral oils.

Example 2

To 100 parts of rosin, 15 parts of polyvinyl acetate (the product available commercially under the name Gelva-V-25) were added and the mixture was heated to a temperature of about 270° C. for a half hour, after which 11½ parts of glycerol were added and the heating continued at a temperature ranging from 270° C. to 279° C. for a period of about five hours. The resinous product had an acid number of 8.2 and was extremely soluble in mineral oils.

Example 3

To 100 parts of rosin, 25 parts of the polyvinyl acetate of the preceding example were added and 12½ parts of glycerine were added, after which the mixture was heated to a temperature ranging from 270° C. to 275° C. for four hours. The final product had an acid number of 10 and was very soluble in mineral oils.

Example 4

To 100 parts of rosin, 35 parts of polyvinyl acetate of the preceding examples and 13½ parts of diethylene glycol were added and the mixture was heated to a temperature ranging from 270° C. to 279° C. for a period of four and one-half hours. The resinous product had an acid number of 11.6 and was highly soluble in mineral oils.

Example 5

To 100 parts of rosin, 35 parts of a partial polyvinyl butyral containing residual hydroxyl groups and possibly also acetate groups and 13½ parts of glycerine were added and the mixture was heated to a temperature ranging from 270° C. to 278° C. for a period of five hours. The viscous resin had an acid number of 10.4 and was relatively insoluble in mineral oils.

Example 6

To 150 parts of rosin, 25 parts of polyvinyl acetate of Example 2 were added and the mixture, after 5 grams of litharge were added, was heated to a temperature of 270° C. for a period of one-half hour, after which 18 grams of ethylene glycol were added and the mixture maintained at a temperature of 270° C. to 280° C. for a period of four and one-half hours. The final resin had an acid number below 15 and was very soluble in mineral oils.

Example 7

To 100 parts of rosin, 15 parts of a partial polyvinyl acetal proper were added and the mixture was heated to a temperature of 260° C. for a period of four hours, after which 15 parts of glycerine were added, and the mixture was heated to a temperature of 270° C. to 275° C. for a period of four hours. The resinous product was quite viscous and had an acid number less than 15. It was also relatively insoluble in mineral oils.

Example 8

A varnish is made by adding 120 parts of linseed oil to 100 parts of the modified resin produced in Example 2 above, and then heating the mixture to about 290° C. for about three hours. The product is then thinned to the desired consistency with coal tar naphtha and a small amount of manganese naphthenate (sufficient to constitute 0.02 parts of manganese metal per part of oil) is added to the mixture to function as a dryer.

In the claims, the word "acetal" is to be construed in its generic sense unless accompanied by a qualifying term, such as in the expression "polyvinyl acetal proper," in which case it is intended to refer to the species derived from acetaldehyde.

While the invention has been disclosed in terms of specific examples employing certain materials in definitely stated proportions, the description is intended to be merely illustrative. It is obvious that various modifications may be made without departing from the spirit of the invention and it is to be understood that this invention is limited only by the appended claims.

I claim:

1. A viscous resinous product of reaction at a temperature of about 270° C. to about 280° C. of a polyhydric alcohol, a member of the group consisting of rosin and hydrogenated rosin, and a member of the group consisting of polyvinyl esters of saturated organic acids and partial polyvinyl acetals.

2. A viscous, homogeneous resinous product of reaction at a temperature of about 270° C. to about 280° C. of a polyhydric alcohol, rosin, and a member of the group consisting of polyvinyl esters of saturated organic acids and partial polyvinyl acetals.

3. A viscous resinous product obtained from the reacting at a temperature of about 270° C. to about 280° C. of a member selected from the group consisting of the polyvinyl esters of saturated organic acids and partial polyvinyl acetals with rosin and the subsequent reacting at a temperature of about 270° C. to about 280° C. of the resulting product with a polyhydric alcohol.

4. A viscous, homogeneous resinous product of reaction at a temperature of about 270° C. to about 280° C. of a polyhydric alcohol, rosin, and polyvinyl acetate.

5. A viscous resinous product obtained from the reacting at a temperature of about 270° C. to about 280° C. of rosin and polyvinyl acetate and the subsequent reacting at a temperature of about 270° C. to about 280° C. of the resulting product with a polyhydric alcohol.

6. A viscous resinous product of reaction at a temperature of about 270° C. to about 280° C. of a polyhydric alcohol, rosin, and a partial polyvinyl butyral.

7. A viscous resinous product of reaction at a temperature of about 270° C. to about 280° C. of a mixture of a polyhydric alcohol, rosin, and a partial polyvinyl butyral.

8. A viscous resinous product obtained from the reacting at a temperature of about 270° C. to about 280° C. of rosin and a partial polyvinyl butyral and the subsequent reacting at a temperature of about 270° C. to about 280° C. of this resulting product with a polyhydric alcohol.

9. A viscous, homogeneous resinous product of reaction at a temperature of about 270° C. to about 280° C. of glycerol, rosin, and a member of the group consisting of polyvinyl esters of saturated organic acids and partial polyvinyl acetals.

10. A viscous resinous product obtained from the reacting at a temperature of about 270° C. to about 280° C. of rosin and a member selected from the group consisting of polyvinyl esters of saturated organic acids and partial polyvinyl acetals and the subsequent reacting at temperature of about 270° C. to about 280° C. of the resulting product with glycerol.

11. A viscous resinous product obtained from the reacting at a temperature of 270° C. to about 280° C. of rosin, polyvinyl acetate, and glycerol.

12. A viscous resinous product of reaction at a temperature of about 270° C. to about 280° C. of a mixture of glycerol, rosin, and a partial polyvinyl butyral.

13. A viscous resinous product obtained from the reacting at a temperature of 270° C. to about 280° C. of a member selected from the group consisting of rosin and hydrogenated rosin and a member selected from the group consisting of polyvinyl esters of saturated organic acids and partial polyvinyl acetals and the subsequent reacting of the resulting product at a temperature of 270° C. to about 280° C. with a polyhydric alcohol.

14. A viscous resinous product obtained from the reaction at a temperature of about 270° C. to about 280° C. of rosin and a partial polyvinyl butyral and the subsequent reacting of this resulting product with glycerol at a temperature of about 270° C. to about 280° C.

15. A viscous resinous product obtained from the reaction at a temperature of about 270° C. to about 280° C. of a polyhydric alcohol, a member of the group consisting of rosin and hydrogenated rosin, and polyvinyl acetate.

16. A viscous resinous product obtained from the reaction at a temperature of about 270° C. to about 280° C. of a polyhydric alcohol, a member of the group consisting of rosin and hydrogenated rosin, and a partial polyvinyl butyral.

PAUL O. POWERS.